United States Patent [19]

Schuster

[11] 4,281,247

[45] Jul. 28, 1981

[54] ROLLER ELECTRODE FOR USE IN APPARATUS FOR TREATING PLASTIC FILM WITH HIGH VOLTAGE CORONA DISCHARGE

[76] Inventor: Samuel J. Schuster, 617 Vallombrosa, Pasadena, Calif. 91107

[21] Appl. No.: 91,384

[22] Filed: Nov. 5, 1979

[51] Int. Cl.$^{3}$ .................... A01T 19/04

[52] U.S. Cl. .................... 250/324; 250/325; 101/153

[58] Field of Search .................... 250/324, 325, 326, 315; 101/152, 153, DIG. 13

[56] References Cited

U.S. PATENT DOCUMENTS 2,590,321 3/1952 Huebner .................... 74/336

4,202,965 6/1980 Eichler .................... 250/324

FOREIGN PATENT DOCUMENTS 1159923 10/1969 United Kingdom .

*Primary Examiner*—Bruce C. Anderson

*Attorney, Agent, or Firm*—Fraser and Bogucki

[57] ABSTRACT

A roller electrode is disclosed which comprises a tubular outer casing of dielectric material, a shaft and an electrically conductive composition filling the annular cavity defined by the casing and shaft. The composition, which is in intimate contact with the casing and shaft, may comprise a cementitious matrix, such as casting plaster, in which conductive particles of carbon or the like are bound.

9 Claims, 2 Drawing Figures

ROLLER ELECTRODE FOR USE IN APPARATUS FOR TREATING PLASTIC FILM WITH HIGH VOLTAGE CORONA DISCHARGE

FIELD OF THE INVENTION

This invention relates generally to rollers of the type that serve as the ground electrode in apparatus for treating plastic film and the like with high voltage corona discharge, and particularly to an improved roller electrode that is economically manufactured and may be disposed of in the event of failure.

BACKGROUND OF THE INVENTION

It is well known that the surface treatment of various kinds of plastic film by exposure to a high voltage corona discharge improves the adhesion characteristics of the film surface so as to render it receptive to adherends such as printing ink.

The typical corona discharge treating apparatus for this purpose includes a stationary electrode connected to a high voltage alternating current source and positioned close to a backing roller about which the flim is passed and which serves as the ground electrode.

In existing apparatus the roller electrode comprises a steel or aluminum core, either solid or tubular, coated with a dielectric material that serves as an insulative barrier between the core and the corona discharge. The core is ground and polished to a very accurate dimensional tolerance preparatory to receiving the dielectric coating whose outer surface must also be accurately ground. Such rollers are both expensive to manufacture and to recoat. Recoating is necessary whenever the dielectric barrier breaks down causing arcing between the electrodes and consequent damage to the film being processed. Such breakdowns occur frequently.

SUMMARY OF THE INVENTION

Roller electrodes in accordance with the present invention can be fabricated for a small fraction of the cost of manufacturing existing rollers and for less than the cost of recoating. Because it is so economical, the roller of the invention may be disposed of in the event of failure. Despite its economy, the roller electrode of the present invention is exceedingly durable and provides a uniform corona dischage along its entire working length.

Pursuant to an exemplary embodiment of the invention, a roller electrode is provided that includes a tubular outer casing of dielectric material and a shaft positioned coaxially of the casing. The casing and shaft define between them an annular cavity that is filled with an electrically conductive composition comprising a base material in which conductive particles are dispersed, the composition being in intimate contact with the casing and the shaft. The base material is preferably of the type that is cast in place in a plastic condition. For example, the conductive composition may comprise a cementitious matrix of plaster or the like in which conductive particles, such as powdered carbon or metal, are bound.

Other objects, features and advantages of the invention will become evident from a reading of the detailed description below in conjunction with the accompanying drawings in which:

FIGS. 1 and 2 are end and front elevation views, respectively, partly in cross-section, of portions of an apparatus for treating plastic film with high voltage corona discharge and including a roller electrode pursuant to the invention.

DETAILED DESCRIPTION OF THE PREFERRED EMBODIMENT

Figure 1:
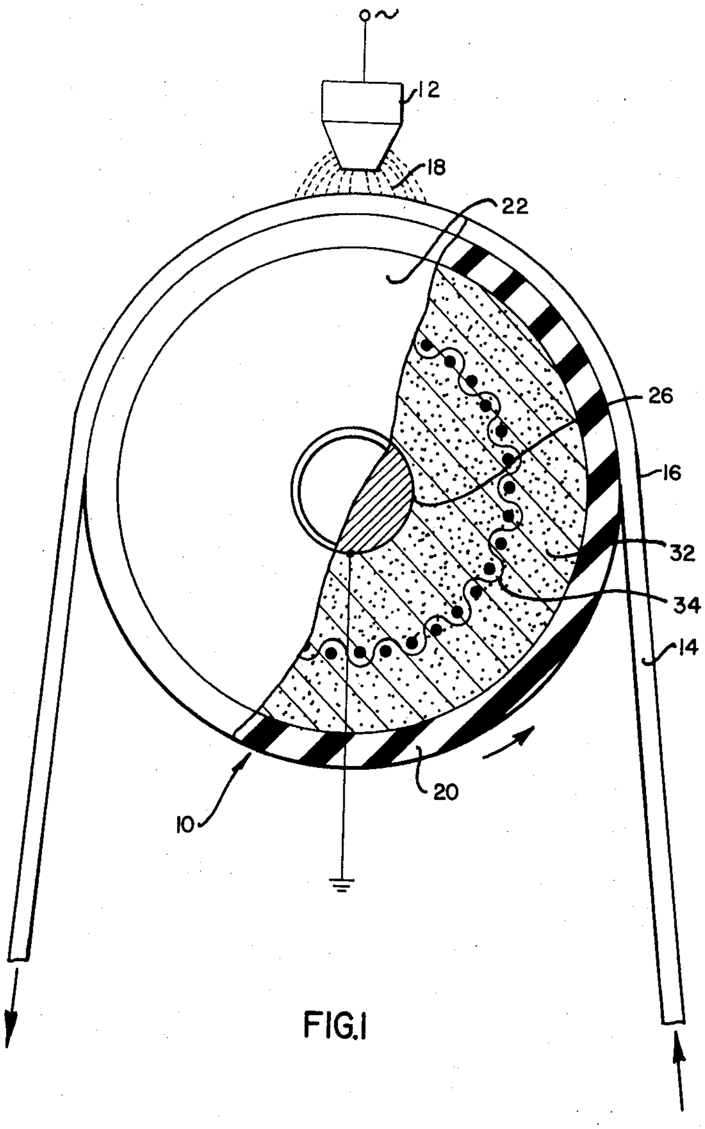
Figure 2:
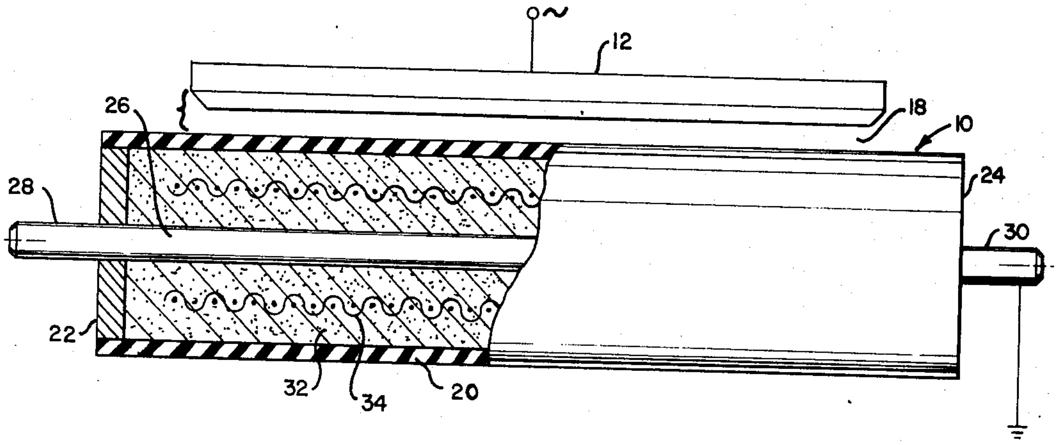

Referring now to the drawings, there is shown portions of a corona discharge film treating appparatus including a rotatable grounded roller electrode 10 and a fixed bar electrode 12 positioned above and in close proximity to the outer surface of the roller 10. A plastic film 14 having a surface 16 to be subjected to corona discharge treatment is drawn over the roller 10 for travel in the direction indicated by the arrows. The film 14 is transported by appropriate drive and tensioning mechanisms that are not shown but are well known in the art.

The fixed electrode 12 is connected to a high voltage alternating current source. By way of example, a voltage of 20 kv at a frequency of 10 kHz may be employed. The resulting corona discharge generated in the gap 18 between the electrodes 10 and 12 is shown schematically by a series of broken lines in FIG. 1.

The grounded roller electrode 10 that is the subject of the invention includes an outer tubular casing 20 of an appropriate dielectric material. Fiberglass, ceramic, hard rubber or the like is suitable. In accordance with a pracical example of the invention, the casing 20 is made of a length of reinforced fiberglass pipe having a smooth interior surface 4″(10.16 cm) in diameter. The casing is sealed by end plugs 22 and 24.

A steel shaft 26 positioned coaxially of the casing 20 and having end portions 28 and 30 projecting from the end plugs 22, 24 serves to support the roller 10. The shaft 26 is coupled to an appropriate ground connection.

The inner surface of the casing 20 and the outer surface of the shaft 26 define an annular cavity that is filled with a conductive composition 32 in intimate contact with the surfaces of the casing and the shaft. Broadly, the composition 32 comprises a base material in which conductive particles are dispersed. The base material preferably consists of a substance cast in place in a plastic condition. A cementitious matrix such as ordinary casting plaster within which conductive particles of carbon are bound is a specific example of the composition 32. Alternatively, the particles may consist of a powdered metal such as aluminum.

In large rollers, the composition 32 may be reinforced with embedded wire mesh 34 or the like.

The proportioning of the ingredients of composition 32 is such as to provide the required electrical and mechanical properties. Where the composition comprises casting plaster and finely divided carbon, 1:1 and 2:3 parts by weight plaster to carbon are examples of practical mixtures. To this is added a quantity of water sufficient to render the resulting mixture pourable but short of an amount that would undesirably impair the strength of the hardened composition. It will be obvious to those skilled in the art that various admixtures may be included in the mix to achieve desired mechanical or other characteristics. For example, agents such as asbestos fiber may be used to fill voids and to minimize shrinkage of the composition during setting.

The roller electrode 10 is conveniently manufactured by capping off one end of the casing 20 with one of the end plugs 22 or 24, inserting the shaft 26 through the end plug and, with the assembly standing on end and the shaft position stabilized, slowly pouring the plaster/carbon/water mixture into the annular cavity between the casing and the shaft. To minimize air entrapment and assure intimate contact of the composition 32 with the casing and shaft, pouring is best accomplished in stages while vibrating the casing with a vibrator appparatus. Upon completion of the filling process the other end plug is inserted. The plugs 22 and 24 may simply be held in place by an interference fit with the casing. Last, after the composition 32 sets the outside of the casing 20 is machined to provide both a true, smooth outer surface and the required casing thickness, for example, 0.1" (2.54 mm).

What is claimed is:

1. A roller electrode for use in apparatus for treating plastic film with high voltage corona discharge, said electrode comprising:

a tubular outer casing of dielectirc material, the casing having opposite ends;

a shaft positioned coaxially of the casing and having end portions projecting from the ends of the casing, the inner surface of the casing and the outer surface of the shaft definng an annular cavity; and an electrically conductive composition within the annular cavity, said composition comprising a cementitious matrix in which conductive particles are bound, the composition being in intimate contact with the inner surface of the casing and the outer surface shaft.

2. A roller electrode, as defined in claim 1, in which :he cementitious composition comprises plaster and finely divided carbon uniformly dispersed in the plaster.

3. A roller electrode, as defined in claim 1, in which :he cementitious composition contains reinforcing elenents.

4. A roller electrode, as defined in claim 1, in which the tubular outer casing is made of fiberglass.

5. A roller electrode for use in apparatus for treating plastic film with high voltage corona discharge, said electrode comprising:

a tubular outer casing of dielectric material, the casing having opposite ends;

a shaft positioned coaxially of the casing, the casing and shaft defining an annular cavity; and an electrically conductive composition within the cavity, the composition comprising a base material in which conductive particles are dispersed, the composition being in intimate contact with the casing and shaft, said base material being one that is cast in place in a plastic condition.

6. A roller electrode for use in apparatus for treating plastic film with high voltage corona discharge, said electrode comprising:

a tubular outer casing of dielectiric material, the casing having end plugs;

a shaft positioned coaxially of the casing and having end portions projecting from the end plugs of the casing, the inner surface of the casing and the outer surface of the shaft defining an annular cavity; and an electrically conductive composition filling the annular cavity, the composition including plaster and finely divided carbon uniformly dispersed in the plaster, the composition being in intimate contact with the casing and shaft.

7. A roller electrode, as defined in claim 6, in which the composition comprises approximately equal parts by weight of plaster and carbon.

8. A roller electrode, as defined in claim 6, in which the tubular outer casing is made of fiberglass.

9. A roller electrode, as defined in claim 6, in which the composition contains reinforcing elements.

* * * * *

UNITED STATES PATENT AND TRADEMARK OFFICE
CERTIFICATE OF CORRECTION

PATENT NO. : 4,281,247

DATED : July 28, 1981

INVENTOR(S) : Samuel J. Schuster

It is certified that error appears in the above-identified patent and that said Letters Patent are hereby corrected as shown below:

Column 1, line 23, "flim" should read --film--; line 46, "dischage" should read --discharge--. Column 2, line 7, "appparatus" should read --apparatus--; line 27, "pracical" should read --practical--. Column 3, line 6, "appparatus" should read --apparatus--; line 19, "dielectirc" should read --dielectric--; line 24, "definng" should read --defining--. Column 4, line 19, "dielectiric" should read --dielectric--.

Signed and Sealed this

*Sixth* Day of *October 1981*

[SEAL]

*Attest:*

GERALD J. MOSSINGHOFF

*Attesting Officer* *Commissioner of Patents and Trademarks*